United States Patent
Hess et al.

(10) Patent No.: US 10,427,911 B2
(45) Date of Patent: Oct. 1, 2019

(54) DAMPER UNIT FOR AN ELEVATOR

(71) Applicant: Inventio AG, Hergiswil (CH)

(72) Inventors: Stephan Hess, Emmenbrucke (CH); Hubert Steiner, Ebikon (CH)

(73) Assignee: INVENTIO AG, Hergiswil NW (CH)

( * ) Notice: Subject to any disclaimer, the term of this patent is extended or adjusted under 35 U.S.C. 154(b) by 109 days.

(21) Appl. No.: 15/535,081

(22) PCT Filed: Dec. 14, 2015

(86) PCT No.: PCT/EP2015/079652
§ 371 (c)(1),
(2) Date: Jun. 12, 2017

(87) PCT Pub. No.: WO2016/096764
PCT Pub. Date: Jun. 23, 2016

(65) Prior Publication Data
US 2018/0086599 A1 Mar. 29, 2018

(30) Foreign Application Priority Data

Dec. 17, 2014 (EP) .................................... 14198489

(51) Int. Cl.
*B66B 5/20* (2006.01)
*B66B 17/34* (2006.01)
*B66B 7/04* (2006.01)
*F16F 13/00* (2006.01)
*F16F 15/02* (2006.01)

(52) U.S. Cl.
CPC ................ *B66B 5/20* (2013.01); *B66B 7/048* (2013.01); *B66B 17/34* (2013.01); *F16F 13/007* (2013.01); *F16F 15/022* (2013.01); *F16F 2228/08* (2013.01); *F16F 2232/08* (2013.01)

(58) Field of Classification Search
CPC . B66B 5/20; B66B 7/048; B66B 17/34; F16F 13/007; F16F 15/022; F16F 2228/08; F16F 2232/08
See application file for complete search history.

(56) References Cited

U.S. PATENT DOCUMENTS 4,047,597 A * 9/1977 Okura ..................... B66B 7/047
187/409
5,503,257 A * 4/1996 Sugita ....................... B66B 5/18
188/250 B (Continued)

FOREIGN PATENT DOCUMENTS

CN 1458901 A 11/2003
EP 1424302 A1 6/2004

(Continued)

*Primary Examiner* — Michael A Riegelman
(74) *Attorney, Agent, or Firm* — William J. Clemens; Shumaker, Loop & Kendrick, LLP

(57) ABSTRACT

A damper unit for an elevator for reducing vertical vibrations of an elevator car of the elevator during a standstill includes a stamp-like acting element that acts on an end-face guide surface of a guide rail. The acting element is spaced from the guide rail in an idle position and can be connected slip-free to the guide rail by an eccentric drive in an active position. Force transmitting elements containing a shock damper for damping the motions of the elevator car during a standstill of the car adjoin the acting element.

15 Claims, 3 Drawing Sheets

(56) References Cited

U.S. PATENT DOCUMENTS

| | | | | |
|---|---|---|---|---|
| 5,518,088 A * | 5/1996 | Brosilow | F16D 65/0006 188/205 A |
| 6,176,350 B1 * | 1/2001 | Schlosser | B66B 5/20 187/359 |
| 6,318,505 B1 * | 11/2001 | De Angelis | B66B 11/0293 187/292 |
| 6,371,261 B1 * | 4/2002 | Thompson | B66B 5/22 187/370 |
| 8,141,685 B2 * | 3/2012 | Utsunomiya | B66B 11/028 187/292 |
| 8,573,365 B2 * | 11/2013 | Ito | B66B 5/22 187/371 |
| 8,631,909 B2 * | 1/2014 | Draper | B66B 5/06 187/373 |
| 9,457,989 B2 * | 10/2016 | Meierhans | B66B 5/20 |
| 9,708,159 B2 * | 7/2017 | Rieser | B66B 5/20 |
| 2004/0188190 A1 * | 9/2004 | Niwa | F16D 65/0025 188/73.37 |
| 2004/0191014 A1 * | 9/2004 | May | B23B 51/044 408/67 |
| 2007/0007083 A1 * | 1/2007 | Husmann | B66B 5/20 187/366 |
| 2010/0089705 A1 * | 4/2010 | Grundmann | B66B 17/34 187/249 |
| 2011/0198159 A1 * | 8/2011 | Arai | B66B 13/22 187/355 |
| 2011/0226560 A1 * | 9/2011 | Husmann | B66B 5/18 187/359 |
| 2011/0233004 A1 * | 9/2011 | Roberts | B66B 17/34 187/247 |
| 2011/0278111 A1 * | 11/2011 | Junk | B60T 1/04 188/74 |
| 2013/0081907 A1 * | 4/2013 | Meierhans | B66B 5/20 187/359 |
| 2013/0175744 A1 * | 7/2013 | Goshima | F16F 13/108 267/140.13 |
| 2013/0248298 A1 * | 9/2013 | Osmanbasic | B66B 5/20 187/359 |
| 2014/0158473 A1 | 6/2014 | Arai et al. | |
| 2014/0332324 A1 * | 11/2014 | Husmann | B66B 5/20 187/359 |
| 2015/0129365 A1 * | 5/2015 | Olkkonen | B66D 5/08 187/250 |
| 2015/0291392 A1 * | 10/2015 | Steiner | B66B 7/046 187/410 |
| 2015/0321883 A1 * | 11/2015 | Husmann | B66B 5/20 187/374 |
| 2017/0355563 A1 * | 12/2017 | Zimmerli | B66B 17/34 |
| 2018/0127238 A1 * | 5/2018 | Guo | B66B 5/0025 |

FOREIGN PATENT DOCUMENTS

| | | |
|---|---|---|
| FR | 351915 | 7/1905 |
| JP | H03018577 A | 1/1991 |
| WO | 2010065041 A1 | 6/2010 |

* cited by examiner

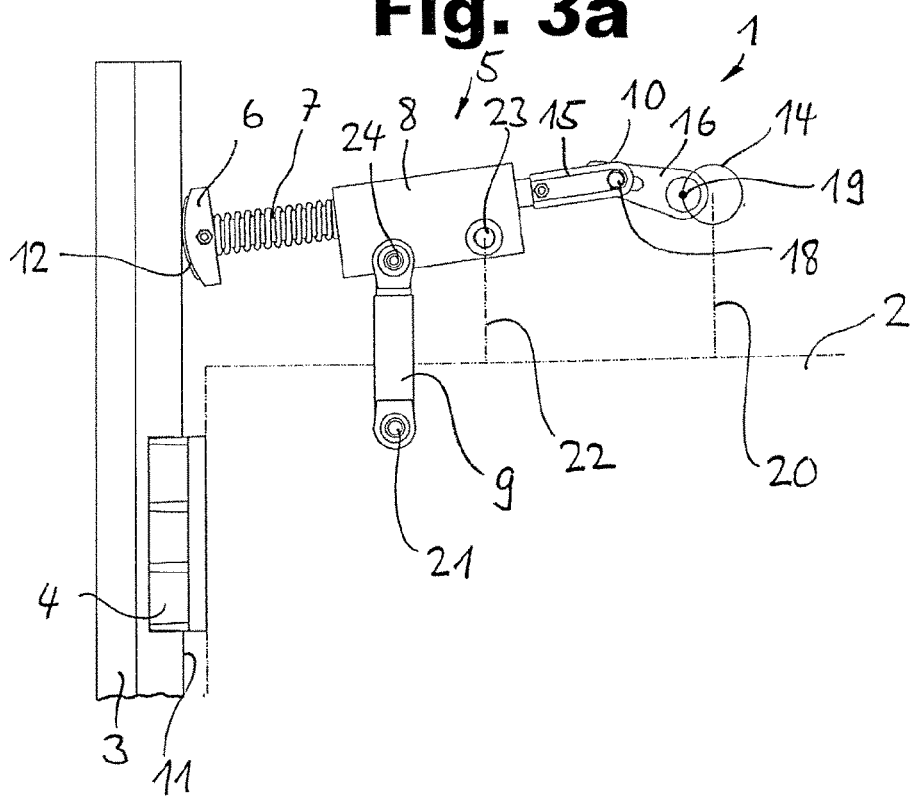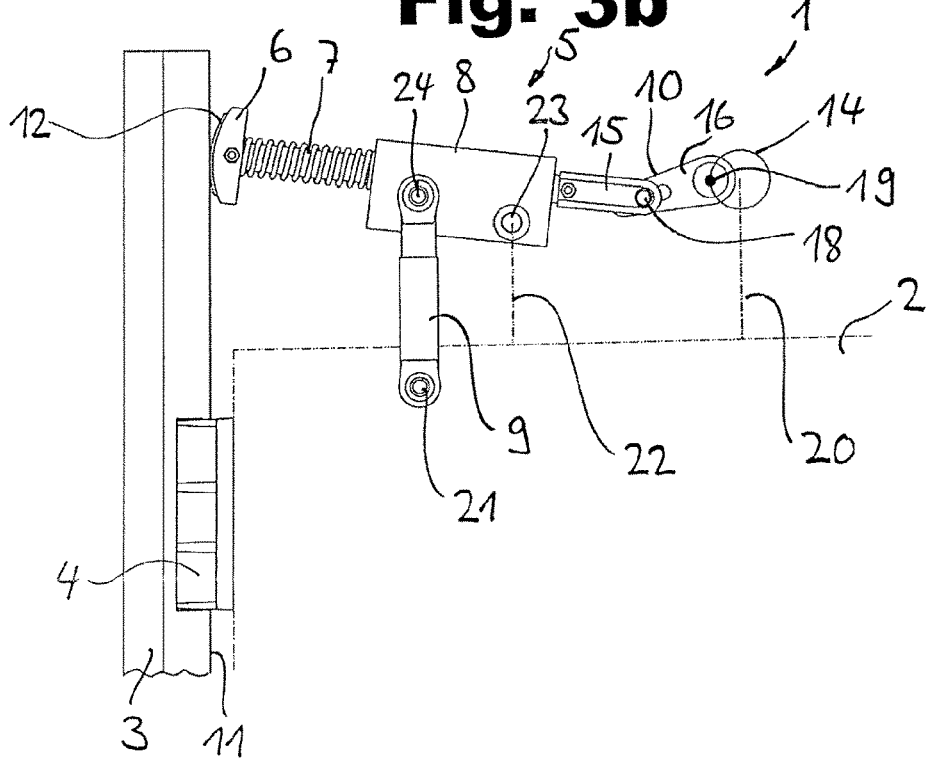

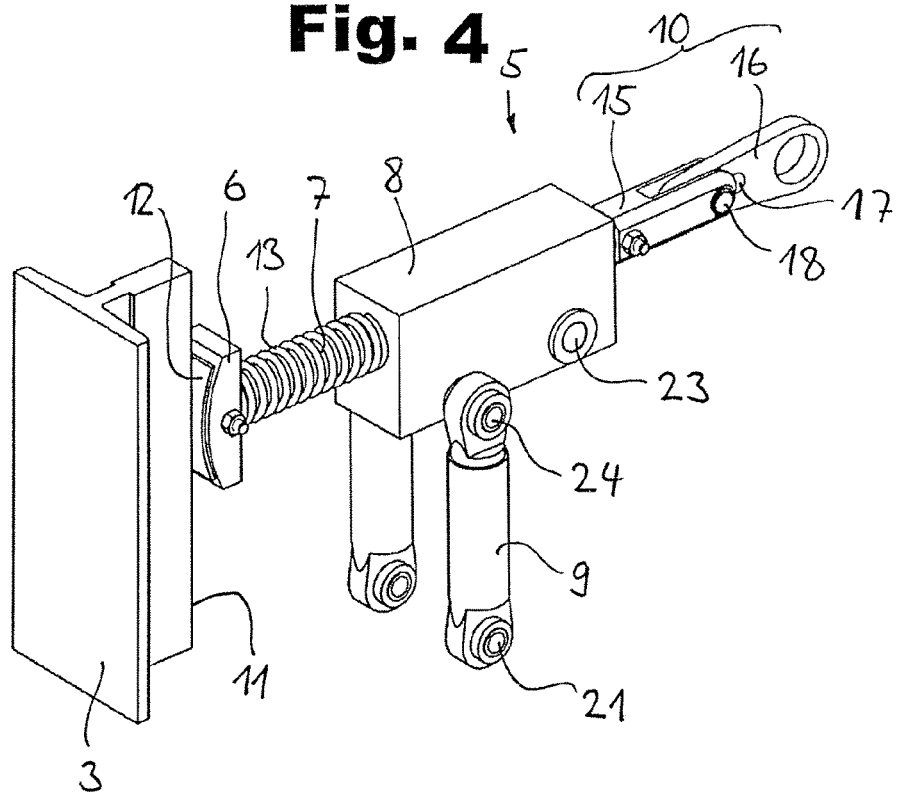

DAMPER UNIT FOR AN ELEVATOR

FIELD

The invention relates to a damper unit for an elevator for reducing vibrations of an elevator car of the elevator during a standstill.

BACKGROUND

People or goods that enter or exit an elevator car create undesirable vertical vibrations because of the elasticity of the support means. Such vertical vibrations arise particularly in elevators using carrying straps as carrying means, which have been growing in popularity recently. Since straps have an unfortunate vibration behavior compared to steel cables, the vertical vibrations adversely affect the comfort of the passengers. The problem otherwise worsens as elevator height increases. For reduction of such vertical vibrations, the use is known of separate damper units that act upon the guide rails with a small braking force, compared to, for example, catch brakes or other safety-related braking devices.

A comparable generic damper unit is known, for example, from EP 1 424 302 A1. It shows an elevator car having a damper unit with a braking element, wherein the braking element is pressed against a side guide surface of the guide rail during a standstill of the car. To activate the damper unit, it is mechanically coupled to a door-opening unit of the elevator car. The braking element causes an abrasive, frictional contact on the guide rail in the active position. In practice, it has been shown that it is difficult and requires a comparatively large effort to reduce the vertical vibrations using a damper unit of this sort.

WO 2010/065041 A1 shows a further unit, wherein the damper unit has a friction member acting on the guide rail for damping.

SUMMARY

It is, therefore, an object of the present invention to avoid the disadvantages of the known damper units and in particular to create a damper unit for an elevator by which the vibrations, in particular the vertical vibrations of the elevator car during a standstill, can be simply and efficiently reduced.

These objectives are achieved according to the invention by a damper unit that features an engagement means, which in its idle position is spaced apart from the guide rail and interference-free car trips are thus possible. The engagement means in an active position can work together with the guide rail to reduce vibrations, in particular vertical vibrations, of the car at a standstill. Since the engagement means is an acting element, which in the active position is connected in a slip-free manner and since the damper unit has force transmitting elements attaching to the acting element for receiving and damping the movement of the elevator car in the active position of the acting element, car movements and thus vibrations, in particular vertical vibrations, can be effectively damped during the standstill. The slip-free connection also leads to simpler predictability and design of the force transmitting elements. The guide rails are then treated gently, which has a positive effect on the comfort of the ride.

For example, it would be possible to use as the acting element an actively or passively operating magnet that effects a slip-free connection to the metallic, iron-based guide rail of the acting element in the active position by magnetic force. It is especially advantageous, however, if the acting element has a contact side provided with a traction element to prevent slippage. The traction element can, for example, be a rubber coating. It could also be conceivable to use nanoparticles as a traction element to prevent slippage. Traction element here refers to frictionally effective means which ensure that the acting element does not slip along the guide rail or that at least almost no sliding friction occurs between the acting element and the guide rail, at least during normal operating conditions in the case of a stopped car. The acting element could, for example, have a contact side, which can rest against or be rested against by a corresponding guide surface of the guide rail. The acting element remains connected to the rail, motionless in a vertical orientation, while the elevator car moves up and down during a car standstill. However, the acting element does not necessarily have to have a flat contact side. Other shapes are conceivable for the acting element with respect to the contact side. A rolling acting element can be included in the invention, wherein the rolling acting element in the active position of the acting element executes a rolling movement against the guide rail during a car standstill.

The acting element can preferably have a contact side that is formed from a material having a friction coefficient greater than 1 and preferably greater than 1.2. Using such a material, the required slip-free connection between the acting element and the guide rail for reducing vertical vibrations can be achieved.

The acting element can include, at least in the area of the contact side, an elastic material, which can be deformed by pressure on the guide rail in the active position of the acting element. The acting element can have, for example, a metallic base body, onto which a contact element made of an elastic material is applied. A particularly secure, slip-free connection between the guide rail and acting element in the active position can be achieved by deformation.

In a further embodiment, the contact side of acting element can be made of a rubber-based rubber coating, in particular of ethylene propylene diene rubber (EPDM) or nitrile butadiene rubber (NBR). Such a rubber coating could, for example, be sprayed onto the metallic base body of the acting element and vulcanized. A prefabricated contact element made from EPDM or NBR could also be glued to the base body or otherwise attached to it.

An advantageous connection between the guide rail and the acting element in the active position could be achieved if the acting element has a convex form. For this purpose, the engagement means can be a stamp-like acting element having at least one convex contact side in the idle position, which engages into an end-face guide surface of the guide rail or connects via this guide surface of the guide rail.

One contact surface of the acting element can be cylindrical, at least in the idle position of the acting element, and form an arc when seen from the side. With an acting element of this sort, the acting element in the active position can at least partially execute a rolling motion on the guide rail.

The force transmitting element can include a ram that extends in a horizontal direction in its installed state with the acting element arranged on its free end. Using a ram of this type, the acting element can easily be brought from the idle position into an active position.

It can be particularly advantageous if the ram is mounted axially and in an elastically displaceable manner via a spring element within a housing to produce a preload force. The spring can be a mechanical spring, for example a compression spring. The spring element can ensure that the acting element remains connected to the guide rail or contacts the guide rail during vertical movements of the car during a car standstill.

In a further embodiment, the force transmitting elements can include at least one shock damper hinged to the housing. The shock damper in the idle position can be transversely oriented and preferably at a right angle to the ram. Consequently, the shock damper would be vertically oriented in the installed state. According to the choice of the shock damper type and its specifications, one, two or even a plurality of shock dampers could be provided for each damper unit.

The shock damper can be a pneumatic or hydraulic shock damper, a shock damper having elastomer compression, a friction damper or a spring shock damper.

To move the acting element from the idle position into the active position, the damper unit can include an actuator. The actuator can be based on a drive motor and include, for example, a stepping motor, or comprise a hydraulic or pneumatic element or a linear drive.

In a preferred embodiment, the damper unit can contain, for example, an eccentric drive driven by an electric motor as an actuator for moving the acting element from the idle position into the active position.

It is especially advantageous if the force transmitting elements have a lever assembly connected to the eccentric drive by which the acting element can be moved in order to move the acting element in a linear manner against the guide rail, for example in a transition from the idle position into the active position.

The lever assembly can be formed having two arms and have two lever elements that are coupled via a hinge and a freewheel in a pivoted and displaceable manner.

Another aspect of the invention relates to an elevator having at least one previously described damper unit. It may be advantageous if the elevator has two damper units per elevator car, wherein each guide rail for guiding the elevator car can be assigned its own damper unit. Additionally, sliding guide shoes or rolling guide shoes can be advantageously provided on the elevator car for guiding the elevator car.

DESCRIPTION OF THE DRAWINGS

Further individual features and advantages of the invention are derived from the following description of an exemplary embodiment and from the drawings. Shown are:

FIGS. 3a and 3b show the elevator having the damper unit from FIG. 2 in the active position, but on a car moved slightly up or down during a standstill; and FIG. 4 is a perspective representation of the damper unit in the active position.

DETAILED DESCRIPTION

Figure 1:
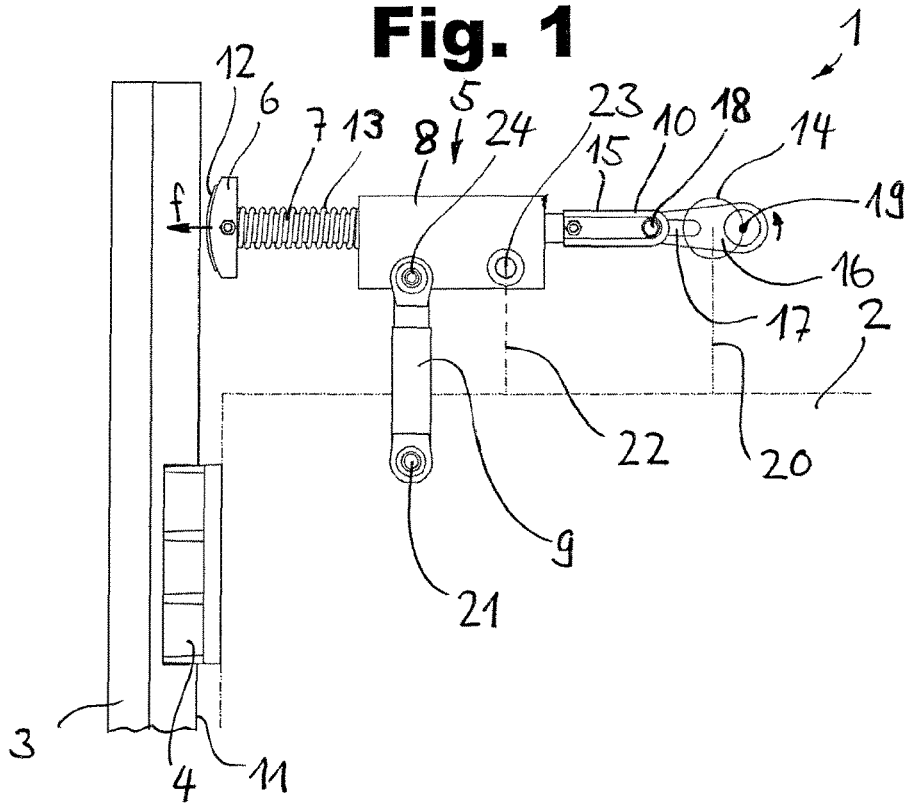
FIG. 1 is a partial representation of an elevator in a side view having a damper unit according to the invention, wherein the damper unit is in an idle position.

FIG. 1 shows a complete depiction of an elevator 1 together with a car 2 that is guided on vertical guide rails 3 having guide surfaces 11. Here, the car is only illustrated in a simplified and partial manner. Vertically oriented car 2, indicated by a dashed line, can move up and down and serves to transport people or goods. Carrying means (not shown) designed, for example, as straps or ropes serve as carrying means for moving car 2. For guiding car 2, the elevator generally has two guide rails 3, which extend in a vertical direction. Guide shoes 4 are arranged on car 2 for car guidance. Sliding guide shoes or rolling guide shoes are possible guide shoes 4. As an example, a damper unit 5 is arranged in the area of the car roof of car 2 and is used to reduce the undesired vertical vibrations of car 2 during a standstill. According to car design and space requirements, damper unit 5 could also be placed on the car in a different manner. The vertical vibrations arise if people enter or leave car 2. The load change results in the vibration of car 2. This phenomenon is especially pronounced in particular in elevators based on carrying straps and elevators having high shaft heights.

Figure 2:
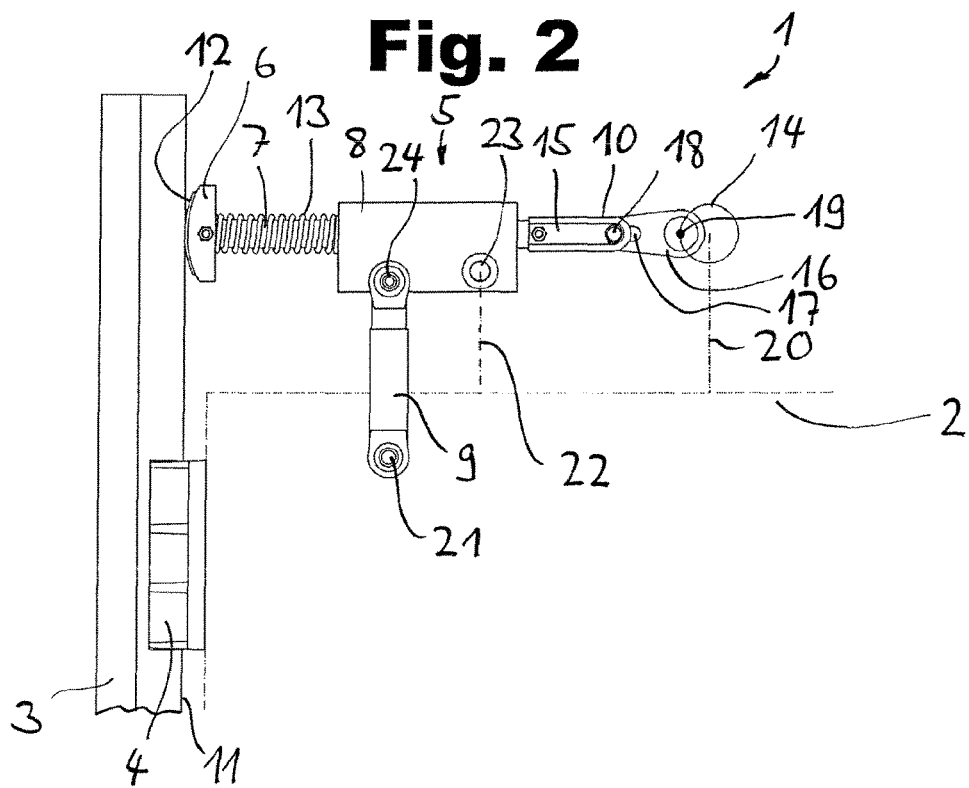
FIG. 2 shows the damper unit from FIG. 1 in an active position.

Damper unit 5 has an acting element 6 that can work together with guide rail 3 to reduce vertical vibrations during a car standstill. FIG. 1 shows acting element 6 in an idle position, in which the acting element is spaced apart from guide rail 3. Using an actuator more closely described below, acting element 6 can be moved towards guide rail 3. In an active position, acting element 6 then acts upon guide rail 3. The closing direction for creating the active position is indicated in FIG. 1 by an arrow f. The active position after the end of the aforementioned closure process is shown in FIG. 2.

Acting element 6 has a contact side 12 facing guide rail 3, which when unaffected in the idle position of acting element 6—as is clear from FIG. 1—forms an arc when viewed from the side. Contact side 12 is advantageously cylindrically formed (see FIG. 4 below). An acting element having a spherical, cap-shaped contact side is also conceivable. Acting element 6 is mounted to a ram 7, which is movable back and forth in a horizontal direction via an actuator. Damper unit 5 can be controlled via a control device (not shown). This control device sends a control command to activate damper unit 5, for example, as soon as the car stops or if the car door opens. The activation is generally maintained until the doors are again closed and no further significant load changes are possible.

Ram 7 is mounted axially and in an elastically displaceable manner via a spring element 13 within a housing 8 to produce a preload force. This spring element could otherwise also be arranged differently, for example inside housing 8. Located at the rear end of ram 7 is a lever assembly 10, which is connected to an eccentric drive designated as 14. Eccentric drive 14 and lever assembly 10 move ram 7 and with it also acting element 6, in a linear direction against guide rail surface 11. A control body 19 can be recognized on eccentric drive 14, which is found in an upper, eccentric position. During a car standstill, the eccentric drive is activated and control body 19 is brought into a lower eccentric position. The corresponding rotational motion of eccentric drive 14 is indicated by a curved arrow. Eccentric drive 14 is connected to car 2 via bracket 20 indicated by a symbol. An indicated connection 22, represented by a symbol, is provided on car 2, which carries damper unit 5. Housing 8 of damper unit 5 is pivoted via a hinge 23 at connection 22.

Lever assembly 10 is formed having two arms and has two lever elements 15 and 16 that are coupled via a hinge 18 and a freewheel 17 in a pivoted and displaceable manner. Freewheel 17 causes lever element 16 to be pushed against lever element 15 in a first phase after activation of eccentric drive 14 and only in a second phase is lever element 15 and the ram affixed thereto pushed against the guide rail via acting element 6 in direction f. Freewheel 17 has the purpose of protecting a simple electric motor used, for example, as a drive (not shown) from overload. Of course, it would also be possible to use particularly robust, but usually comparatively expensive, however, electric motors, in which case a freewheel could be omitted. Of course, it would also be possible to use other actuators instead of motor-driven eccentric drives 14, such as linear drives, to move acting element 6 against the guide rail.

FIG. 2 as well as FIGS. 3a and 3b show damper unit 5 having acting element 6 in the active position. As is shown in FIG. 2, acting element 6 acts upon a guide surface indicated as 11 on the end face of guide rail 3. Contact side 12 of engagement member 6 is formed by a rubber coating based on rubber that has a fiction coefficient preferably greater than 1.2. The rubber coating can be designed, as in the present exemplary embodiment, as a rubber-based layer that is applied to a stamp-like base body, made from, for example, a metallic material (e.g. steel). Due to the special shape and design of contact side 12 of acting element 6, acting element 6 is connected slip-free to guide rail 3 in the active position. Because the acting element is elastic, thanks to the choice of materials, acting element 6 is pressed together and deformed against guide rail 3, at least in the area of contact side 12, when the active position is created. A slight flattening of contact side 12 can be recognized in FIG. 2 upon closer inspection. Because of the local deformation of acting element 6, slippage between acting element 6 and guide rail 3 during vertical vibration of elevator car 2 is practically eliminated.

In order to reduce vertical vibrations during a standstill of the car, possible movements upwards (FIG. 3a) and downwards (FIG. 3b) are attenuated via a shock damper 9. Shock damper 9 is connected to car 2 via hinge 24. On its side facing hinge 24, shock damper 9 also has a hinge 21, wherein hinge 21 forms a swiveling connection to housing 8. The machine components connected to acting element 6 including ram 7, housing 8, shock damper 9 and lever assembly 10, which is connected to the eccentric drive, thus form a force transmitting element to absorb and damp the movements of elevator car 2 in the active position of acting element 6 during a standstill in order to reduce the vertical vibrations. Shock damper 9 is in the idle position (FIG. 1) as well as in the neutral active position according to FIG. 2, perpendicular to ram 7 and thus oriented in a vertical direction.

Design details for a possible embodiment of damper unit 5 can be deduced from FIG. 4. In FIG. 4, for example, it can be recognized that acting element 6 with its stamp-like configuration presses against end face 11 in the active position. Contact side 12 of acting element 6 is clearly formed as a cylinder with respect to the side view. Damper unit 5 has a shock-absorber pair with two shock absorbers 9, which ensures a compact and stable damper unit. Housing 8, in which ram 7 is displaceably mounted, is configured as open in this example. Guide rail 3 is designed as a T-profile. Of course, other guide rails, for example profile shapes that are prismatic in cross section, would also be appropriate in conjunction with damper unit 5 according to the invention. Instead of guide rail 3, it is also conceivable that acting element 6 could act on other parts of the elevator. For example, acting element 6 could be pressed against the shaft wall.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A damper unit for an elevator, the damper unit being arranged on an elevator car of the elevator for reducing vibrations of the elevator car during a standstill, comprising:
an acting element, in an idle position, being spaced apart from a guide rail of the elevator, the acting element, in an active position, being connected slip-free to the guide rail; and
force transmitting elements attached to the acting element for damping movements of the elevator car in the active position of the acting element to reduce vibrations of the elevator car, where the force transmitting elements include a ram that extends in a horizontal direction with a free end on which the acting element is arranged, and the force transmitting elements further include at least one shock damper hinged to a housing, wherein in the idle position the at least one shock damper is transversely oriented to the ram, and the at least one shock damper is configured to attenuate vertical vibrations of the elevator car through changes in length.

2. The damper unit according to claim 1 wherein the acting element has a contact side provided with a traction element to prevent slippage when connected to the guide rail.

3. The damper unit according to claim 2 wherein the contact side is formed from a material having a static friction coefficient greater than 1.

4. The damper unit according to claim 2 wherein the acting element, at least in an area of the contact side, includes an elastic material that is deformed by pressing on the guide rail in the active position of the acting element.

5. The damper unit according to claim 2 wherein the contact side of the acting element is made of a rubber-based rubber coating.

6. The damper unit according to claim 5 wherein the rubber-based rubber coating is one of ethylene propylene diene rubber (EPDM) and nitrile butadiene rubber (NBR).

7. The damper unit according to claim 1 wherein the acting element has at least one convex contact side, wherein in the active position of the acting element the convex contact side is connected to an end-face guide surface of the guide rail.

8. The damper unit according to claim 1 wherein the acting element has a contact side forming an arc.

9. The damper unit according to claim 1 wherein the ram is mounted axially and in an elastically displaceable manner via a spring element within a housing to produce a preload force on the acting element.

10. The damper unit according to claim 1 wherein the at least one shock damper is vertically oriented.

11. The damper unit according to claim 1 wherein the at least one shock damper is one of a pneumatic shock damper, a hydraulic shock damper, a shock damper having elastomer compression, a friction shock damper, and a spring shock damper.

12. The damper unit according to claim 1 including an eccentric drive acting as an actuator to move the acting element from the idle position into the active position.

13. The damper unit according to claim 12 wherein the force transmitting elements include a lever assembly connected to the eccentric drive for moving the acting element from the idle position into the active position in a linear direction against the guide rail.

14. The damper unit according to claim 13 wherein the lever assembly is formed with two lever elements coupled via a hinge and a freewheel.

15. An elevator having an elevator car with at least one of the damper unit according to claim 1 arranged thereon.

* * * * *